US007227958B2

(12) United States Patent
Hsieh

(10) Patent No.: US 7,227,958 B2
(45) Date of Patent: Jun. 5, 2007

(54) CONNECTOR DEVICE FOR DETECTING INSERTION OR REMOVAL OF PLUG FROM COMMON JACK

(75) Inventor: Yao-Ting Hsieh, Tai-Chung (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 705 days.

(21) Appl. No.: 10/708,396

(22) Filed: Feb. 29, 2004

(65) Prior Publication Data

US 2005/0191887 A1 Sep. 1, 2005

(51) Int. Cl.
*H04B 1/40* (2006.01)

(52) U.S. Cl. ..................... 381/74; 324/538; 455/575.2; 379/433.1

(58) Field of Classification Search .................. 381/74, 381/77, 309, 87, 376; 324/538; 455/575.2; 379/433.1
See application file for complete search history.

(56) References Cited

U.S. PATENT DOCUMENTS 6,069,960 A * 5/2000 Mizukami et al. ............ 381/74
6,594,366 B1 * 7/2003 Adams ........................ 381/74
7,071,702 B2 * 7/2006 Hsieh et al. ................ 324/538

* cited by examiner

*Primary Examiner*—Ping Lee
(74) *Attorney, Agent, or Firm*—Winston Hsu

(57) ABSTRACT

A connector device includes a common jack connected to a first information-handling apparatus and a plug connected to a second information-handling apparatus. The plug is adapted for insertion into the common jack and contains a first conductive surface and a ground contact. A first jack contact is formed on the common jack for receiving communication signals when engaging with the first conductive surface of the plug. A memory buffer is used for receiving the communication signals through the first jack contact and for sending out the communication signals to the first information-handling apparatus when the memory buffer is not empty. A control monitors a status of the memory buffer. When the memory buffer is not empty, the control circuit determines that the plug is inserted into the common jack, and when the memory buffer is empty, the control circuit determines that the plug is removed from the common jack.

23 Claims, 7 Drawing Sheets

CONNECTOR DEVICE FOR DETECTING INSERTION OR REMOVAL OF PLUG FROM COMMON JACK

BACKGROUND OF INVENTION

1. Field of the Invention

The present invention relates to a connector device utilizing a plug and a common jack, and more specifically, to a device and related method for determining when the plug is inserted into or removed from the common jack.

2. Description of the Prior Art

Conventional connector devices for stereo audio apparatuses are well known in the art. Please refer to FIG. 1. FIG. 1 is a diagram of a plug 10 according to the prior art. The plug 10 may be used for a variety of applications such as for connecting headphones to a stereo device or for connecting two information-handling devices for allowing the two information-handling devices to exchange data. The plug 10 contains a first conductive surface 12, a second conductive surface 16, and a ground contact 20. The first conductive surface 12 is used as a right channel audio signal contact or as a receive (Rx) signal contact, and the second conductive surface 16 is used as a left channel audio signal contact or as a transmit (Tx) signal contact, depending on the application of the plug 10. The ground contact 20 is used to provide a ground reference to the plug 10. An insulator 14 is used to separate the first conductive surface 12 and the second conductive surface 16, and another insulator 18 is used to separate the second conductive surface 16 and the ground contact 20. As shown in FIG. 1, the first conductive surface 12, the second conductive surface 16, and the ground contact 20 are arranged successively from a tip of the plug 10.

Please refer to FIG. 2 with reference to FIG. 1. FIG. 2 is a diagram of a common jack 30 according to the prior art. The common jack 30 is used for receiving the plug 10 and for making electrical contact with the plug 10. The common jack 30 contains first pins 32, second pins 34, and third pins 36 for respectively making electrical contact with the first conductive surface 12, the second conductive surface 16, and the ground contact 20 of the plug 10. With the prior art common jack 30, the third pins 36 detect when the plug 10 is inserted into or removed from the common jack 30 by making contact with the ground contact 20 of the plug 10.

Unfortunately, if the plug 10 is not fully inserted into the common jack 30, the third pins 36 may remain in contact with the second conductive surface 16 or even the first conductive surface 12. This incorrect contact with the third pins 36 may lead the common jack 30 to improperly detect that the plug 10 is properly inserted into the common jack 30. When the plug 10 is being used for audio applications, such as for connecting headphones to a stereo device, the improper insertion of the plug 10 into the common jack 30 is not a major problem. The audio will simply not play correctly, but the problem can still be remedied with little harm done. On the other hand, if the plug 10 is to be connected to the common jack 30 for facilitating a data exchange between two information-handling devices, then data may be potentially lost if data transmission is started without a proper connection between the plug 10 and the common jack 30. Attempts have been made at overcoming this problem through the use of complicated software programs utilized for double-checking if the third pins 36 are actually connected to the ground contact 20. However, these software programs are difficult and expensive to both develop and implement. Therefore, a simple solution is required to properly detect insertion and removal of the plug 10.

SUMMARY OF INVENTION

It is therefore an objective of the claimed invention to provide a connector device for connecting information-handling apparatuses in order to solve the above-mentioned problems.

According to the claimed invention, a connector device connecting a first information-handling apparatus and a second information-handling apparatus includes a common jack connected to the first information-handling apparatus and a plug connected to the second information-handling apparatus. The plug is adapted for insertion into the common jack and contains a first conductive surface and a ground contact. The first conductive surface is arranged substantially neighboring to a tip end of the plug. A first jack contact is formed on the common jack for receiving communication signals when engaging with the first conductive surface of the plug. A memory buffer is used for receiving the communication signals through the first jack contact and for sending out the communication signals to the first information-handling apparatus when the memory buffer is not empty. A control circuit is electrically connected to the memory buffer for monitoring a status of the memory buffer. When the memory buffer is not empty, the control circuit determines that the plug is inserted into the common jack, and when the memory buffer is empty, the control circuit determines that the plug is removed from the common jack.

It is an advantage of the claimed invention that the first jack contact detects communication signals received through the first conductive surface of the plug for eliminating the possibility that other surfaces of the plug will incorrectly make contact with the first jack contact.

It is another advantage of the claimed invention that the FIFO buffer is used to detect when the plug is inserted into or removed from the common jack. The FIFO accurately indicates when the plug is correctly inserted by storing communication signals received by the first jack contact.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 2:
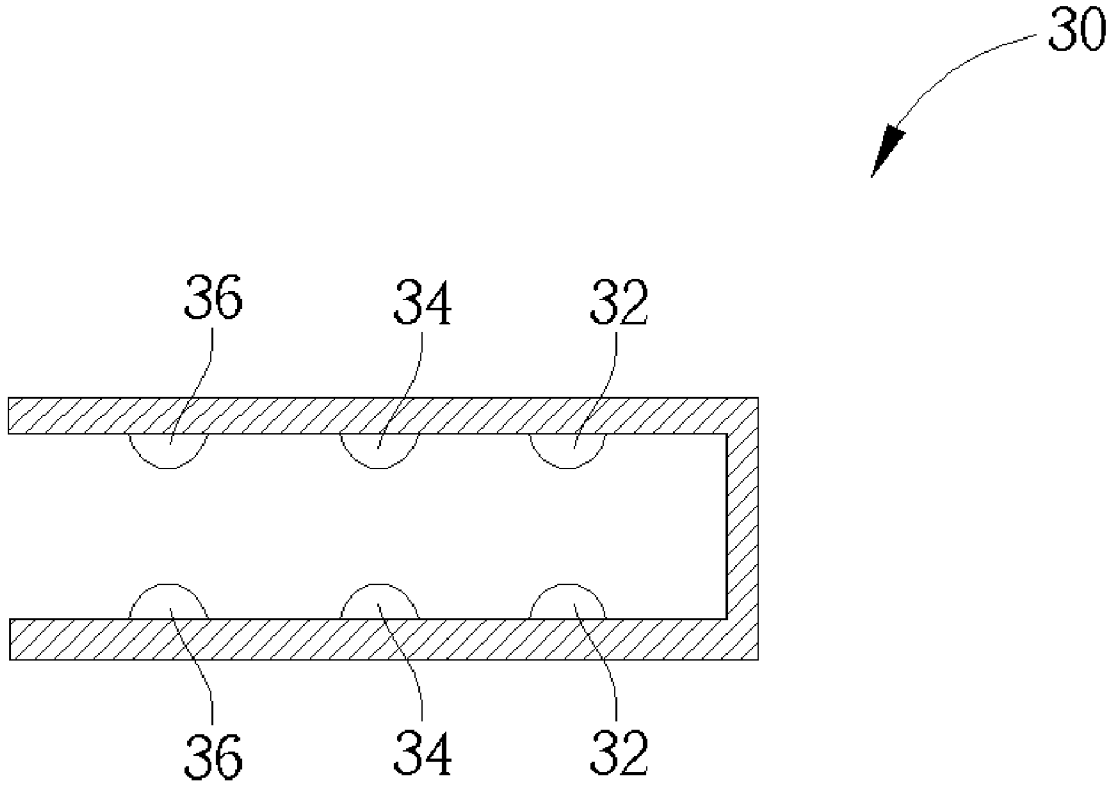
Fig. 2 Prior Art
FIG. 2 is a diagram of a common jack according to the prior art.
Figure 3:
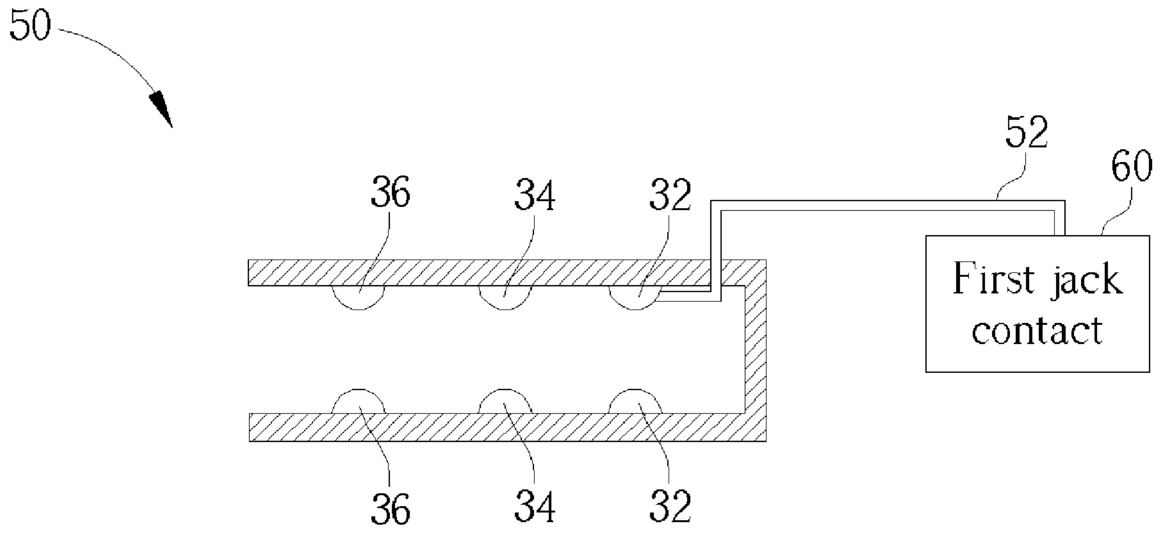
FIG. 3 is a diagram of a common jack according to a first embodiment of the present invention.

Please refer to FIG. 3. FIG. 3 is a diagram of a common jack 50 according to a first embodiment of the present invention. The common jack 50 is an improvement upon the common jack 30 shown in FIG. 2, and the same reference numbers will be used to refer to the same objects. In addition to the first pins 32, second pins 34, and third pins 36, the common jack 50 also comprises an I/O pin 52, such as a GPIO pin, connecting at least one of the first pins 32 to a first jack contact 60. As will be explained below, the first jack contact 60 is used to detect when a plug is inserted into and removed from the common jack 50.

Figure 1:
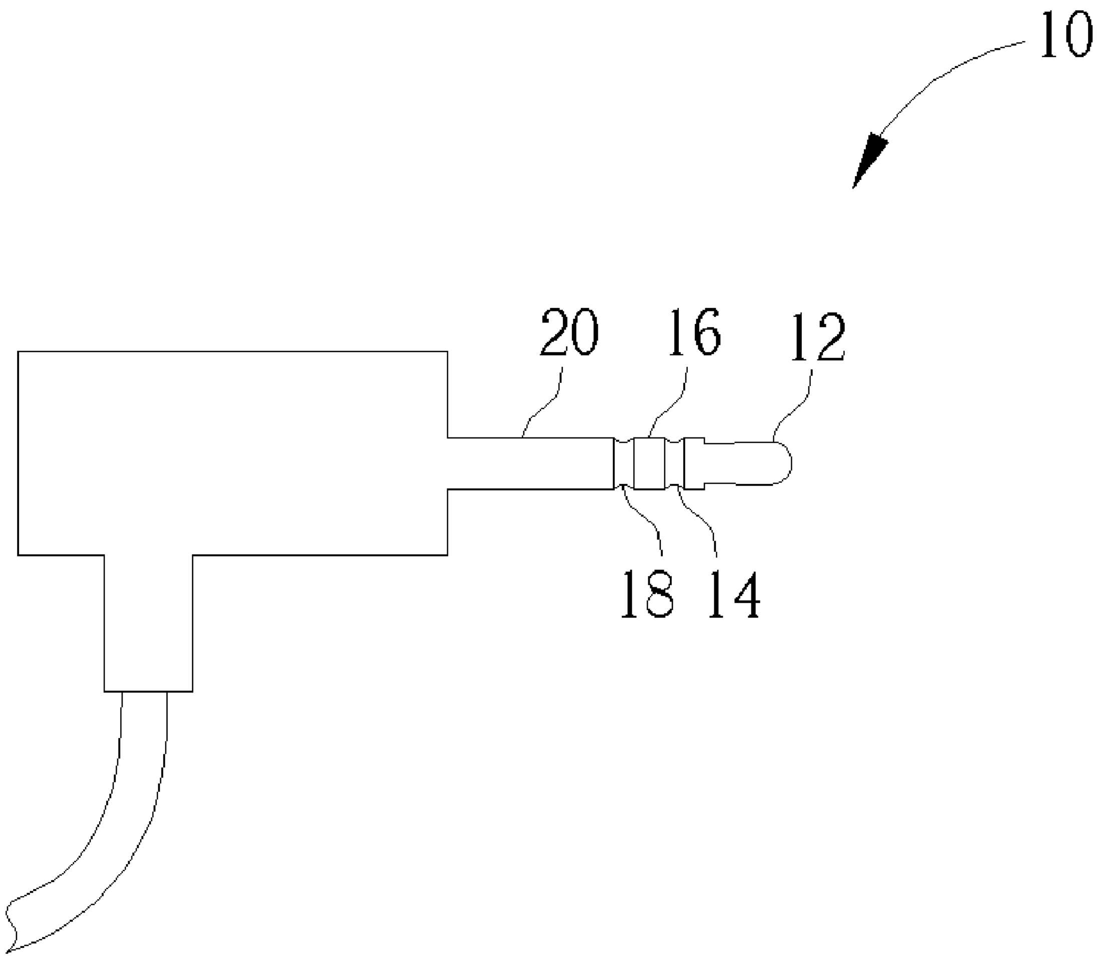
Fig. 1 Prior Art
FIG. 1 is a diagram of a plug according to the prior art.
Figure 4:
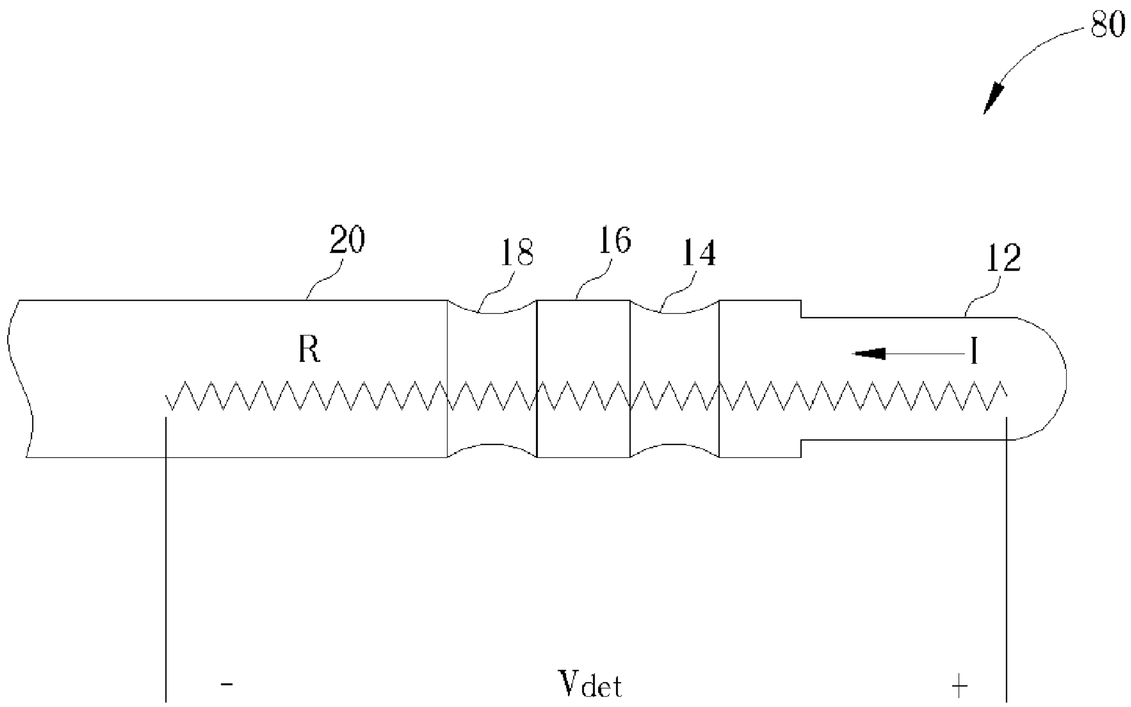
FIG. 4 is a diagram of a plug according to the present invention.

Please refer to FIG. 4. FIG. 4 is a diagram of a plug 80 according to the present invention. The plug is identical to the plug 10 shown in FIG. 1, but also contains a resistor R formed between the first conductive surface 12 and the ground contact 20 of the plug 80. When the plug 80 is inserted into the common jack 50, the common jack sends a current I through the resistor R of the plug 80. A voltage difference Vdet is then formed across the resistor R from the first conductive surface 12 to the ground contact 20. It should be noted that different plugs 80 can be built having different resistance values for the resistor R. Therefore, plugs 80 used for audio devices should have a first resistance value for the resistor R and plugs 80 used for data exchanging information-handling devices should have a second resistance value for the resistor R. If the first and second resistance values are different from each other, the common jack 50 is able to determine which type of plug 80 is inserted into the common jack 50.

Figure 5:
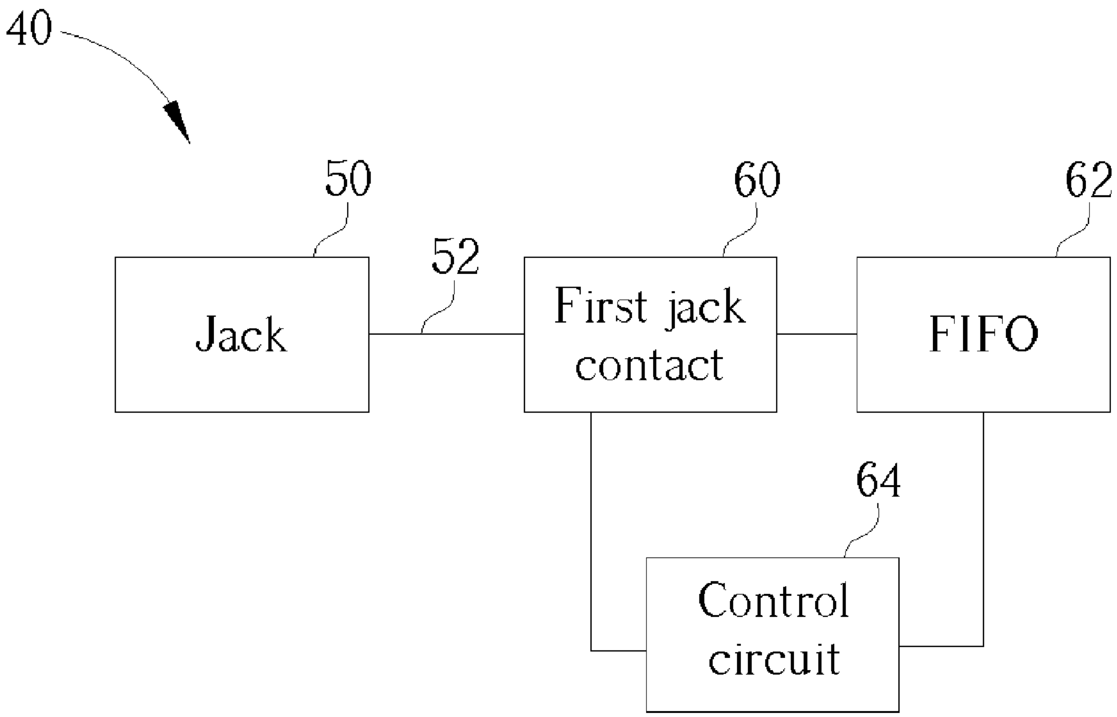
FIG. 5 is a diagram of a connector device according to the present invention.

Please refer to FIG. 5. FIG. 5 is a diagram of a connector device 40 according to the present invention. The connector device 40 can be formed on either a stereo device or a data exchanging information-handling device. The first jack contact 60 detects communication signals received via the I/O pin 52 connected to the first pins 32 of the common jack 50. A control circuit 64 then measures the voltage difference Vdet across the resistor R via the I/O pin 52 and the first jack contact 60. Based on the voltage difference Vdet, the control circuit 64 determines if the plug 80 is part of an audio device or a data exchanging information-handling device.

If the control circuit 64 determines that the plug 80 is part of an audio device, the control circuit 64 sends the right channel audio signals to the stereo device that contains the connector device 40. On the other hand, if the control circuit 64 determines that the plug 80 is part of a data exchanging information-handling device, the control circuit 64 then sends the communication signals detected by the first jack contact 60 to a memory buffer such as a first-in first-out (FIFO) buffer 62. The communication signals detected by the first jack contact 60 represent receive (Rx) signals sent to the plug 80 via the first pins 32. Since the communication signals are a plurality of digital "1" and "0" values, the FIFO buffer 62 can easily be used to store a digital representation of the communication signals. As long as the first conductive surface 12 makes electrical contact with the first pins 32, the FIFO buffer 62 will continuously store successive communication signals.

When the plug 80 of a data exchanging information-handling device is plugged into the common jack 50, the control circuit 64 is also used to monitor a status of the I/O pin 52 and the FIFO buffer 62. (a) When the control circuit 64 detects the I/O pin 52 has a high voltage value, the control circuit 64 determines the plug 80 is properly inserted and engaged with the first pin 32. (b) When the control circuit 64 detects the I/O pin 52 has a low voltage value, but the FIFO buffer 62 is not empty, the control circuit 64 determines the plug is inserted and the data transmitted through the I/O pin 52 is bit "0". (c) When the control circuit 64 detects the I/O pin 52 has a low voltage value, and the FIFO buffer 62 is also empty, the control circuit 64 determines that the plug 80 is not properly inserted into the common jack 50.

In other words, when the I/O pin 52 is in low voltage, it triggers the control circuit 64 to detect the status of FIFO buffer. When the control circuit 64 detects that the FIFO buffer 62 is not empty, the control circuit 64 determines that the plug 80 is making proper connection with the common jack 50 and is correctly inserted. By detecting the status of the FIFO buffer 62, the control circuit 64 can correctly determine whether (a) the plug 80 is not properly inserted, or (b) the plug 80 is properly inserted with a bit "0" transmitted.

If desired, the manufacturer can program the control circuit 64 to give an audible or visual indication to let a user know if the plug 80 is correctly inserted or not. The control circuit 64 can also prevent data from being transmitted until the plug 80 is properly connected to the common jack 50.

Figure 6:
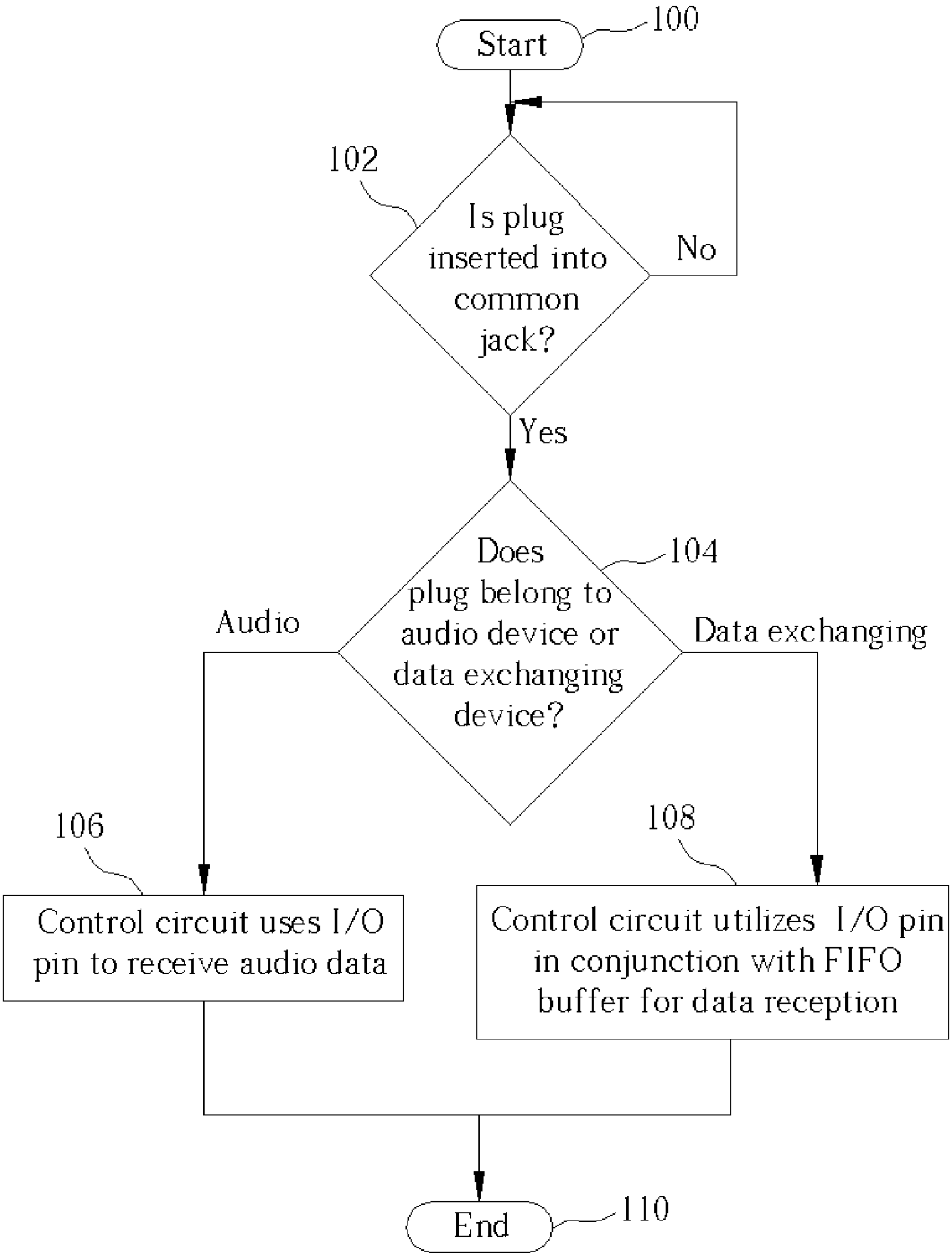
FIG. 6 is a flowchart illustrating verifying insertion of the plug into the common jack according to the present invention method.

Please refer to FIG. 6. FIG. 6 is a flowchart illustrating verifying insertion of the plug 80 into the common jack 50 according to the present invention method. Steps contained in the flowchart will be explained below.

Step 100: Start;

Step 102: Determine if the plug 80 is inserted into the common jack 50 by analyzing the voltage difference Vdet measured across the resistor R of the plug 80. For example, if the plug 80 is not yet inserted into the common jack 50, the I/O pin 52 measures a voltage of approximately 2.6 V. If the plug 80 inserted into the common jack 50 is used for an audio device such as headphones, the associated voltage level is approximately 2.0 V. If the plug 80 inserted into the common jack 50 is used for a data exchanging information-handling device, the associated voltage level is approximately 1.6 V. If the control circuit 64 determines that the plug 80 is not inserted, the flow continues to stay in step 102. If the control circuit 64 determines that the plug 80 has been inserted into the common jack 50, proceed with step 104;

Step 104: Analyze the voltage level to determine if the plug 80 is part of an audio device or a data exchanging information-handling device; if it is an audio device, go to step 106; if it is a data exchanging information-handling device, go to step 108;

Step 106: Since the plug 80 belongs to an audio device, the control circuit 64 uses only the I/O pin 52 to receive right channel audio signals; go to step 110;

Step 108: Since the plug 80 belongs to a data exchanging information-handling device, the control circuit 64 uses the I/O pin 52 in conjunction with the FIFO buffer 62 for data reception; and Step 110: End.

Figure 7:
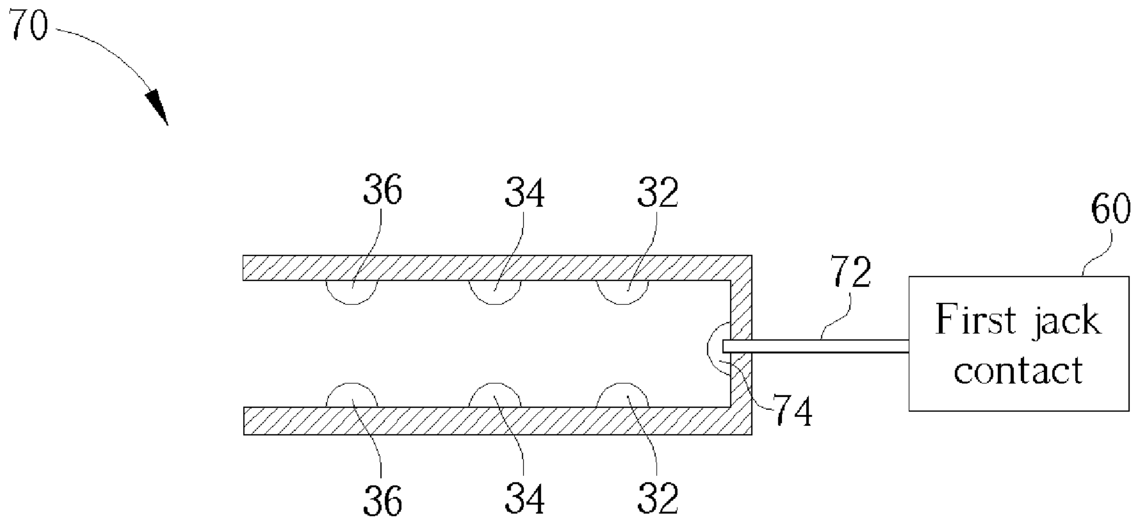
FIG. 7 is a diagram of a common jack according to a second embodiment of the present invention.

Please refer to FIG. 7. FIG. 7 is a diagram of a common jack 70 according to a second embodiment of the present invention. The common jack 70 is almost identical to the common jack 50 shown in FIG. 3 except that the common jack 70 contains a sensing pin 74 disposed at an innermost end of the common jack 70. The sensing pin 74 is used to make contact with the first conductive surface 12 at the tip of the plug 80. The sensing pin 74 is connected to the first jack contact 60 through an I/O pin 74 for transferring communication signals from the sensing pin 74 to the first jack contact 60. In the common jack 70, the sensing pin 74 performs a dedicated task of sending communication signals to the first jack contact 60. However, in the common jack 50, the first jack contact 60 is electrically connected to one or more of the first pins 32 for receiving the communication signals.

It should be noted that in the present invention, the first jack contact 60 is preferably electrically connected to the inner most pin (such as the first pin 32 or the sensing pin 74) so that the first jack contact 60 can only come in contact with the correct contact of the plug 80. Also note that if the standards for the plug 80 and the common jacks 50 and 70 are changed such that the contacts used for left and right channel audio signals and receive and transmit signals are reversed, the present invention would still apply. In that case, the first jack contact 60 would still preferably be electrically connected to the first pins 32. However, it is also within the scope of the present invention for the first jack contact 60 to instead be electrically connected to at least one of the second pins 34. This scenario would be nearly identical to the case in which the first jack contact 60 is electrically connected to the first pins 32, but would introduce the possibility of the first conductive surface 12 coming in contact with the second pins 34 and producing a false determination that the plug 80 was properly plugged into the common jack.

In contrast to the prior art, the present invention teaches a connector device that senses communication signals being detected from one of the left channel audio, right channel audio, receive, or transmit signal contacts. The prior art, on the other hand, uses the ground contact for detecting whether the plug is inserted into the common jack or not. By sensing communication signals used by the contact at the tip of the plug, the present invention effectively eliminates the possibility that the connector device 40 will incorrectly detect that the plug 80 has been inserted into or removed from the common jack 50 and 70.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A connector device connecting a first information-handling apparatus and a second information-handling apparatus, comprising:

a common jack connected to the first information-handling apparatus;

a plug connected to the second information-handling apparatus, the plug adapted for insertion into the common jack, the plug comprising a first conductive surface and a ground contact, the first conductive surface arranged substantially neighboring to a tip end of the plug;

a first jack contact formed on the common jack for receiving communication signals when engaging with the first conductive surface of the plug;

a memory buffer for receiving the communication signals through the first jack contact, and sending out the communication signals to the first information-handling apparatus when the memory buffer is not empty; and a control circuit electrically connected to the memory buffer for monitoring a status of the memory buffer, wherein when the memory buffer is not empty, the control circuit determines that the plug is inserted into the common jack, and when the memory buffer is empty, the control circuit determines that the plug is removed from the common jack.

2. The connector device of claim 1 wherein the plug further comprises a second conductive surface disposed between the first conductive surface and a ground contact.

3. The connector device of claim 2 wherein the first information-handling apparatus is a stereo audio apparatus and the second information-handling apparatus is a headphone.

4. The connector device of claim 3 wherein the first conductive surface of the plug serves as a right channel audio signal contact and the second conductive surface of the plug serves as a left channel audio signal contact.

5. The connector device of claim 2 wherein the first and second information-handling apparatuses are connected for exchanging data in one direction or two directions.

6. The connector device of claim 5 wherein the first conductive surface of the plug serves as a receive (Rx) signal contact and the second conductive surface of the plug serves as a transmit (Tx) signal contact.

7. The connector device of claim 1 wherein the first jack contact is disposed near an inner end of the common jack for being capable of only contacting the first conductive surface of the plug when the plug is inserted into the common jack.

8. The connector device of claim 1 wherein the memory buffer is a first-in first-out (FIFO) memory buffer.

9. A method of verifying insertion or removal of a plug into a common jack, the plug comprising a first conductive surface, and a ground contact, wherein the first conductive surface is arranged substantially neighboring to a tip end of the plug, the method comprising:

detecting communication signals received by the common jack through the first conductive surface of the plug;

storing the received communication signals in a memory buffer;

sending out the communication signals stored in the memory buffer to the first information-handling apparatus when the memory buffer is not empty; and monitoring the status of the memory buffer to determine whether the plug is inserted into or removed from the common jack, wherein when the memory buffer is not empty, it is determined that the plug is inserted into the common jack, and when the memory buffer is empty, it is determined that the plug is removed from the common jack.

10. The method of claim 9 wherein the plug further comprises a second conductive surface disposed between the first conductive surface and a ground contact.

11. The method of claim 10 wherein the common jack is located in a stereo audio apparatus and the plug is electrically connected to a headphone, thereby sending audio signals fro the stereo audio apparatus to the headphone.

12. The method of claim 11 wherein the first conductive surface of the plug serves as a right channel audio signal contact and the second conductive surface of the plug serves as a left channel audio signal contact.

13. The method of claim 10 wherein the plug connects to the common jack for exchanging data in one direction or two directions.

14. The method of claim 13 wherein the first conductive surface of the plug serves as a receive (Rx) signal contact and the second conductive surface of the plug serves as a transmit (Tx) signal contact.

15. The method of claim 9 wherein the memory buffer is a first-in first-out (FIFO) memory buffer.

16. A connector for electrically connecting a first information-handling apparatus to a plug connected to a second information-handling apparatus, the plug comprising a first conductive surface and a ground contact, the first conductive surface arranged substantially neighboring to a tip end of the plug, the connector comprising:

a common jack connected to the first information-handling apparatus;

a first jack contact formed on the common jack for receiving communication signals when engaging with the first conductive surface of the plug;

a memory buffer for receiving the communication signals through the first jack contact, and sending out the communication signals to the first information-handling apparatus when the memory buffer is not empty; and a control circuit electrically connected to the memory buffer for monitoring a status of the memory buffer, wherein when the memory buffer is not empty, the control circuit determines that the plug is inserted into the common jack, and when the memory buffer is empty, the control circuit determines that the plug is removed from the common jack.

17. The connector of claim 16 wherein the plug further comprises a second conductive surface disposed between the first conductive surface and a ground contact.

18. The connector of claim 17 wherein the first information-handling apparatus is a stereo audio apparatus and the second information-handling apparatus is a headphone.

19. The connector of claim 18 wherein the first conductive surface of the plug serves as a right channel audio signal contact and the second conductive surface of the plug serves as a left channel audio signal contact.

20. The connector of claim 17 wherein the first and second information-handling apparatuses are connected for exchanging data in one direction or two directions.

21. The connector of claim 20 wherein the first conductive surface of the plug serves as a receive (Rx) signal contact and the second conductive surface of the plug serves as a transmit (Tx) signal contact.

22. The connector of claim 16 wherein the first jack contact is disposed near an inner end of the common jack for being capable of only contacting the first conductive surface of the plug when the plug is inserted into the common jack.

23. The connector of claim 16 wherein the memory buffer is a first-in first-out (FIFO) memory buffer.

* * * * *